US008189959B2

United States Patent
Szeliski et al.

(10) Patent No.: US 8,189,959 B2
(45) Date of Patent: May 29, 2012

(54) IMAGE BLENDING USING MULTI-SPLINES

(75) Inventors: Richard Szeliski, Bellevue, WA (US); Matthew T. Uyttendaele, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1077 days.

(21) Appl. No.: 12/104,446

(22) Filed: Apr. 17, 2008

(65) Prior Publication Data

US 2009/0263045 A1   Oct. 22, 2009

(51) Int. Cl.
*G06K 9/36* (2006.01)
(52) U.S. Cl. ..................................................... 382/284
(58) Field of Classification Search .................. 382/284
See application file for complete search history.

(56) References Cited

U.S. PATENT DOCUMENTS

| | | | | |
|---|---|---|---|---|
| 5,454,070 A * | 9/1995 | Donelly et al. | 345/589 |
| 5,774,133 A * | 6/1998 | Neave et al. | 345/505 |
| 6,075,905 A * | 6/2000 | Herman et al. | 382/284 |
| 6,208,360 B1 * | 3/2001 | Doi et al. | 345/474 |
| 6,256,038 B1 * | 7/2001 | Krishnamurthy | 345/419 |
| 6,469,710 B1 * | 10/2002 | Shum et al. | 345/619 |
| 7,196,702 B1 * | 3/2007 | Lee et al. | 345/419 |
| 7,236,167 B2 * | 6/2007 | Lee et al. | 345/420 |
| 7,417,635 B2 * | 8/2008 | Rockwood et al. | 345/419 |
| 7,596,283 B2 * | 9/2009 | Xu et al. | 382/294 |
| 7,636,091 B2 * | 12/2009 | Rockwood et al. | 345/420 |
| 7,755,623 B2 * | 7/2010 | Rockwood et al. | 345/420 |
| 7,978,932 B2 * | 7/2011 | Vercauteren et al. | 382/284 |
| 2005/0169555 A1 * | 8/2005 | Hasegawa | 382/284 |
| 2005/0249434 A1 * | 11/2005 | Xu et al. | 382/294 |
| 2006/0017739 A1 * | 1/2006 | Fang et al. | 345/582 |
| 2006/0177150 A1 * | 8/2006 | Uyttendaele et al. | 382/284 |
| 2007/0013813 A1 * | 1/2007 | Sun et al. | 348/587 |
| 2007/0076016 A1 * | 4/2007 | Agarwala et al. | 345/629 |
| 2007/0110335 A1 * | 5/2007 | Taylor et al. | 382/284 |
| 2007/0237420 A1 * | 10/2007 | Steedly et al. | 382/284 |
| 2007/0237421 A1 * | 10/2007 | Luo et al. | 382/284 |
| 2009/0041314 A1 * | 2/2009 | Vercauteren et al. | 382/128 |
| 2009/0263045 A1 * | 10/2009 | Szeliski et al. | 382/284 |

FOREIGN PATENT DOCUMENTS

WO   2007016301 A2   2/2007

OTHER PUBLICATIONS

Agarwala, Aseem. "Efficient Gradient-Domain Compositing Using Quadtrees", 2007, ACM Transactions on Graphics (Proceedings of SIGGRAPH 2007).*

Liu, Wei et al, "A Novel Consistency Regularizer for Meshless Non-rigid Image Registration", 2010, "Advances in Visual Computing", p. 242-251.*

(Continued)

*Primary Examiner* — Jason M Repko
*Assistant Examiner* — Gandhi Thirugnanam
(74) *Attorney, Agent, or Firm* — Lyon & Harr, LLP; Richard T. Lyon (57) ABSTRACT

Multi-spline image blending technique embodiments are presented which generally employ a separate low-resolution offset field for every image region being blended, rather than a single (piecewise smooth) offset field for all the regions to produce a visually consistent blended image. Each of the individual offset fields is smoothly varying, and so is represented using a low-dimensional spline. A resulting linear system can be rapidly solved because it involves many fewer variables than the number of pixels being blended.

4 Claims, 6 Drawing Sheets

OTHER PUBLICATIONS

Richard Szeliski, Matthew Uyttendaele, and Drew Steedly. Fast Poisson blending using multi-splines. In International Conference on Computational Photography (ICCP 11), Apr. 2011.*

Richard Szeliski, Matthew Uyttendaele, and Drew Steedly. Fast Poisson blending using multi-splines. Technical Report MSR-TR-2008-58, Microsoft Research, Apr. 2008.*

Richard Szeliski and James Coughlan. Spline-based image registration. Technical Report 94/1, Digital Equipment Corporation, Cambridge Research Lab, Apr. 1994.*

Dauguet, Julien et al.,"Alignment of Large Image Series Using Cubic B-Splines Tessellation: Application to Transmission Electron Microscopy Data", 2007, Medical Image Computing and Computer-Assisted Intervention—MICCAI 2007, p. 710-717.*

Burt, et al., "A Multiresolution Spline with Application to Image Mosaics", ACM Transactions on Graphics, vol. 2, No. 4., Oct. 1983. pp. 217-236.

Levin, et al., "Colorization using Optimization", vol. 23, Issue 3. Aug. 2004. pp. 689-694.

Zomet, et al., "Seamless Image Stitching by Minimizing False Edges" IEEE Transactions in Image Processing. Sep. 4, 2005. pp. 1-8.

Levin, et al., "Seamless Image Stitching in the Gradient Domain", in Proc. of the European Conference on Computer Vision, 2004. pp. 377-389.

Gracias, et al., "Fast Image Blending using Watersheds and Graph Cuts", BMVC 2006. pp. 1-10.

Szelski, "Image Alignment and Stitching: A Tutorial", Last updated, Dec. 10, 2006. Technical Report, MSR-TR-2004-92. 89 Pages.

Agarwala, et al. "Interactive Digital Photomontage". ACM Transactions on Graphics, 23(3):292-300, Aug. 2004.

Perez, et al. "Poisson image editing", ACM Transactions on Graphics, 22(3):313-318, Jul. 2003.

Szeliski, "Locally Adapted Hierarchical Basis Preconditioning". ACM Transactions on Graphics, 25(3):1135-1143, Aug. 2006.

Szelski, et al., "A Comparative Study of Energy Minimization Methods for Markov Random Fields", IEEE Transactions on Pattern Analysis and Machine Intelligence. Mar. 2006. pp. 16-29.

Bishop, "Pattern Recognition and Machine Learning", Chapter 1. Springer 2006. 59 Pages.

Agarwala, "Efficient Gradient-domain Compositing using Quadtrees" ACM Transactions on Graphics, 26(3), Jul. 2007, pp. 94:1-94:5.

Eden, et al., "Seamless Image Stitching of Scenes with Large Motions and Exposure Differences", In IEEE Computer Society Conference on Computer Vision and Pattern Recognition (CVPR'2006). vol. 3. pp. 2498-2505.

Fattal, et al., "Gradient Domain High Dynamic Range Compression", ACM Transactions on Graphics (TOG) archive vol. 21, Issue 3 (Jul. 2002). pp. 249-256.

Saad, "Iterative Methods for Sparse Linear Systems", Second Edition. 2003. 107 Pages.

Szelski, et al., "Spline-Based Image Registration". International Journal of Computer Vision 22, 3 (Mar./Apr.), 199-218. 1997.

Goldman, et al., "Vignette and exposure calibration and compensation", In Tenth International Conference on computer vision (ICCV 2005) vol. 1 899-906.

* cited by examiner

IMAGE BLENDING USING MULTI-SPLINES

BACKGROUND

Image blending is an effective way to hide the intensity discontinuities between different regions that are being seamed together inside an image compositing or stitching application. One popular blending technique computes an image that best matches a set of gradient constraints that are derived from the gradients of the original source images being composited. Generally, this technique re-formulates the blending as an optimization of an offset field (which is sometimes referred to as an offset image or map) that has a zero gradient everywhere except along the seam boundaries, where it must match the difference between the adjacent source images. Inherent in this approach is the requirement to solve a large optimization problem. Multi-grid or hierarchical basis approaches are often used to accelerate the solution of the optimization problem.

SUMMARY

Multi-spline image blending technique embodiments described herein act to adjust the pixel intensity values of image regions being blended to produce a visually consistent blended image. The embodiments described herein generally employ a separate low-resolution offset field for every image region, rather than a single (piecewise smooth) offset field for all the regions. Each of the individual offset fields is smoothly varying, and so is represented using a low-dimensional spline (thus the name multi-spline image blending). The resulting linear system can be rapidly solved because it involves many fewer variables than the number of pixels being blended.

In general, embodiments of the multi-spline image blending technique can be implemented by first associating a separate offset map with each image region being blended. Each of these offset maps is then represented using a separate low-dimensional spline. This is followed by establishing an energy function involving the summation of a set of cost terms, where a separate term is used to match the difference in the blended values of spline control points at each seam pixel to the difference in the original source values, and a separate term is used for each image region to encourage the smoothness of the control points for the region. A system of equations is then solved for the spline control point values that minimize the sum of all the terms. These spline control point values are used in conjunction with a prescribed 2D tensor product spline basis to compute a correction term for each pixel in each image region. The correction terms are then applied to their associated pixels to produce a smoothly blended image.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the multi-spline image blending technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Multi-Spline Image Blending Technique

The multi-spline image blending technique embodiments described herein generally employ a separate low-resolution offset field for every source image, rather than a single (piecewise smooth) offset field for all the source images as is typically used. Each of the individual offset fields is smoothly varying, and so can be represented using a low-dimensional spline (thus the name multi-spline image blending). A resulting linear system can be rapidly solved because it involves many fewer variables than the number of pixels being blended.

Figure 1:
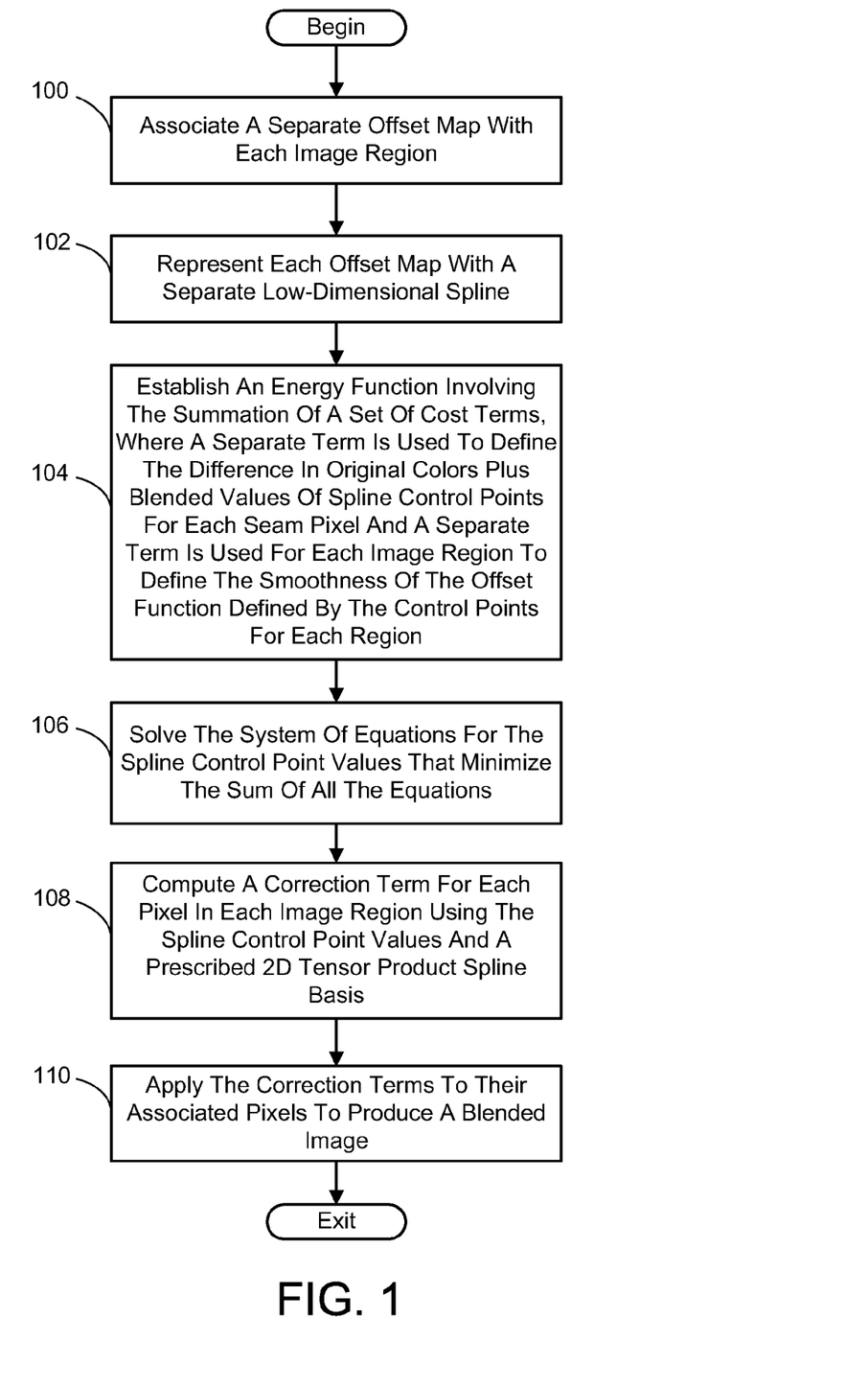
FIG. 1 is a flow diagram generally outlining one embodiment of a process for blending image regions using a multi-spline approach.

In general, embodiments of the multi-spline image blending technique can be implemented as illustrated in the process of FIG. 1. The process begins by associating a separate offset map with each image region being blended (100). Each of these offset maps is then represented using a separate low-dimensional spline (102). This is followed by establishing an energy function involving the summation of a set of cost terms, where a separate term is used to define the difference in original colors plus blended values of spline control points for each seam pixel and a separate term is used for each image region to define the smoothness of the offset function defined by the control points for each region (104). In this case, a seam pixel is a pixel whose location corresponds to the boundary between two adjacent image regions. The resulting system of equations is then solved for the spline control point values that minimize the sum of all the equations (106). These spline control point values are used in conjunction with a prescribed 2D tensor product spline basis to compute a correction term for each pixel in each image region (108). The correction terms are then applied to their associated pixels to produce a blended image from the image regions (110).

It is noted that is the case where the image regions are color image regions, a separate energy function is established for each color channel. The system of equations associated with each color channel is solved separately and the resulting correction terms are also applied to their associated color channel separately. The result is a separate blended color-channel image for each color channel. These separate images can then be combined to produce the aforementioned blended image.

1.1 Image Blending

An image blending problem can be written in discrete form as $$E_1 = \sum_{i,j} s_{i,j}^x [f_{i+1,j} - f_{i,j} - g_{i,j}^x]^2 + s_{i,j}^y [f_{i,j+1} - f_{i,j} - g_{i,j}^y]^2, \tag{1}$$

where $f_{i,j}$ is the desired blended (result) image, $g_{i,j}^x$ and $g_{i,j}^y$ are target gradient values, and $s_{i,j}^x$ and $s_{i,j}^y$ are (potentially per-pixel) gradient constraint (smoothness) weights.

The smoothness weights are all set uniformly, and the gradients are computed from the gradients of the source image being blended in, with additional hard constraints on the boundary of the cut-out region to match the enclosing image. In the general multi-image blending formulation, the gradients are obtained from the gradients of whichever image is being composited inside a given region, $$g_{i,j}^x = u_{i+1,j}^{l_{i,j}} - u_{i,j}^{l_{i,j}} \tag{2}$$

$$g_{i,j}^y = u_{i,j+1}^{l_{i,j}} - u_{i,j}^{l_{i,j}} \tag{3}$$

where $\{u^1 \ldots u^L\}$ are the original unblended source images and $l_{i,j}$ is the label (indicator variable) for each pixel, which indicates which image is being composited. At the boundaries between regions, the average of the gradients from the two adjacent images is used, $$g_{i,j}^x = (u_{i+1,j}^{l_{i,j}} - u_{i,j}^{l_{i,j}} + u_{i+1,j}^{l_{i+1,j}} - u_{i,j}^{l_{i+1,j}})/2 \tag{4}$$

$$g_{i,j}^y = (u_{i,j+1}^{l_{i,j}} - u_{i,j}^{l_{i,j}} + u_{i,j+1}^{l_{i,j+1}} - u_{i,j}^{l_{i,j+1}})/2 \tag{5}$$

Figure 2:
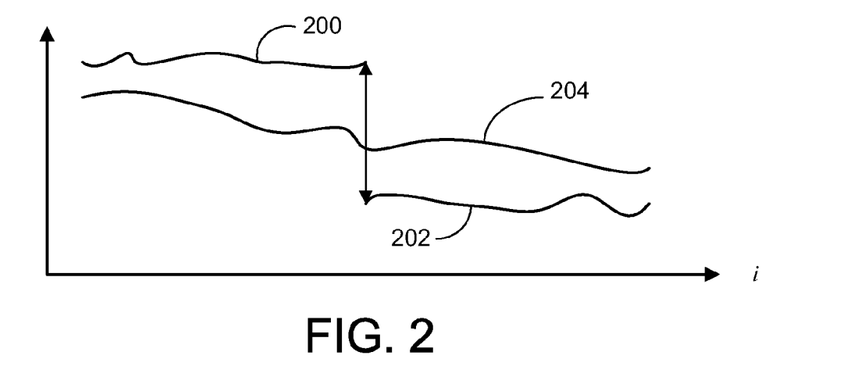
FIG. 2 is a one-dimensional graph showing two image regions blended resulting in a blended function.

Note how these equations reduce to the previous case (2) and (3) on the interior, since the indicator variables are the same. When these equations are solved for the optimal value of $f$, the resulting function reproduces the high-frequency variations in the input images while feathering away low-frequency intensity offsets at the seam boundaries. This function is illustrated in the one-dimensional graph of FIG. 2 where the two source images $u_i^1$ 200 and $u_i^2$ 202 are blended resulting in a blended functions $f_i$ 204.

The per-pixel weights can be tweaked to allow the final image to match the original image with less fidelity around strong edges, where the eye is less sensitive to variations, resulting in what is sometimes called the weak membrane. The weights are set to be constant inside each source region, but can be optionally allowed to be weaker along high gradient seam boundaries, $$s_{i,j}^x = \frac{1}{1 + (g_{i,j}^x/a)^2}, \tag{6}$$

$$s_{i,j}^y = \frac{1}{1 + (g_{i,j}^y/a)^2}, \tag{7}$$

where $\alpha$ is a factor that can range from $\infty$ (for uniform weighting) to about the noise level in the image (say 4 gray levels for a 256-gray level image). If only gradient constraints are used in Eq. (1), the gradient-domain reconstruction problem is underconstrained. To address this, a weak constraint towards the colors in the original image $u_{i,j}^{l_{i,j}}$ is added, $$E_0 = \sum_{i,j} w_{i,j} [f_{i,j} - u_{i,j}^{l_{i,j}}]^2, \tag{8}$$

which reduces unwanted low-frequency variations in the result and helps ensure that the final composite image does not get too light or too dark.

1.2 Offset Formulation

The solution $\{f_{i,j}\}$ can be replaced with an offset from the original (unblended) image, $$f_{i,j} = u_{i,j}^{l_{i,j}} + h_{i,j}, \tag{9}$$

and solved for the offset image $\{h_{i,j}\}$ instead. The new criterion being minimized becomes, $$E_2 = \sum_{i,j} s_{i,j}^x [h_{i+1,j} - h_{i,j} - \tilde{g}_{i,j}^x]^2 + s_{i,j}^y [h_{i,j+1} - h_{i,j} - \tilde{g}_{i,j}^y]^2 + w_{i,j} [h_{i,j}]^2, \tag{10}$$

where the modified gradients $\tilde{g}_{i,j}^x$ and $\tilde{g}_{i,j}^y$ are zero away from the boundaries and $$\tilde{g}_{i,j}^x = (u_{i,j}^{l_{i,j}} - u_{i,j}^{l_{i+1,j}} + u_{i+1,j}^{l_{i,j}} - u_{i+1,j}^{l_{i+1,j}})/2 \tag{11}$$

$$\tilde{g}_{i,j}^y = (u_{i,j}^{l_{i,j}} - u_{i,j}^{l_{i,j+1}} + u_{i,j+1}^{l_{i,j}} - u_{i,j+1}^{l_{i,j+1}})/2 \tag{12}$$

at the boundaries between regions. This can be verified by substituting Eq. (9) into Eq. (1) and Eqs. (4-5).

Figure 3:
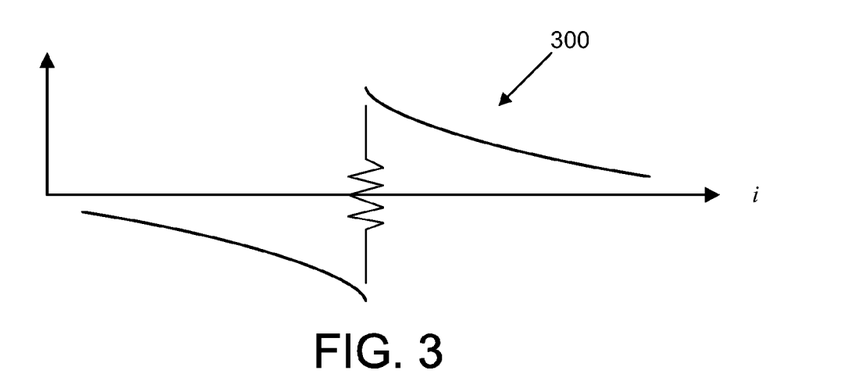
FIG. 3 is a one-dimensional graph showing an offset image fit to zero gradients everywhere except at the image region discontinuity where it jumps by an amount equal to the (negative) average difference across the region boundary.

This new problem has a natural interpretation: the offset image $h_i$ should be everywhere smooth, except at the region boundaries, where it should jump by an amount equal to the (negative) average difference in intensity between the overlapping source images as illustrated in FIG. 3. The resulting offset function 300 is piecewise smooth, which makes it amenable to being represented by a quadtree spline, with smaller grid cells closer to the region boundaries.

1.3 Multiple Offset Maps

Figure 4:
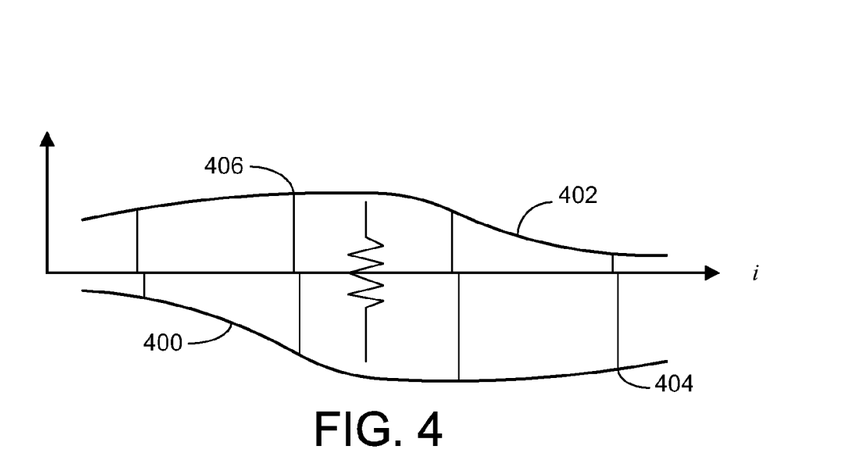
FIG. 4 is a one-dimensional graph showing multiple offset images, each of which is smooth, along with the inter-image constraint at the boundary, and spline control points.

However, instead of using a single offset map, the multi-spline image blending technique embodiments described herein employ a different offset map for each source image, i.e., $$f_{i,j} = u_{i,j}^{l_{i,j}} + h_{i,j}^{l_{i,j}}, \tag{13}$$

where the $\{h^1 \ldots h^J\}$ are now the per-source image offset maps. This function is illustrated in the one-dimensional graph of FIG. 4 having multiple offset images $h_i^1$ 400 and $h_i^2$ 402, each of which is smooth, along with the inter-image constraint at the boundary, and the spline control points $c_j^1$ 404 and $c_j^2$ 406.

The optimization problem (10) now becomes, $$E_3 = \sum_{i,j} s_{i,j}^x \left[ h_{i+1,j}^{l_{i+1,j}} - h_{i,j}^{l_{i,j}} - \tilde{g}_{i,j}^x \right]^2 + \tag{14}$$

$$s_{i,j}^y \left[ h_{i,j+1}^{l_{i,j+1}} - h_{i,j}^{l_{i,j}} - \tilde{g}_{i,j}^y \right]^2 + w_{i,j} \left[ h_{i,j}^{l_{i,j}} \right]^2,$$

Notice that in this problem, whenever two adjacent pixels, say (i,j) and (i+1,j) come from the same source and hence share the same offset map, the gradient $\tilde{g}_{i,j}^x$ is 0, and so the function is encouraged to be smooth. When two adjacent pixels come from different regions, the difference between their offset values is constrained to be the average difference in source values at the two pixels.

What is the advantage of re-formulating the problem using a larger number of unknowns? There is none if all of the $h_{i,j}^l$ are kept as independent variables.

However, under normal circumstances, each of the individual per-source offset maps is expected to be smooth, and not just piecewise smooth as in the case of a single offset map. Therefore, each offset map can be represented at a much lower resolution, as will be described in the next section. This can be stated a little more formally in the following lemma.

Assume that the source images are the result of taking displaced photographs of the same scene under smoothly varying illumination or exposure changes. In that case, the per-source offset maps are themselves smoothly varying, regardless of the shape of the boundaries or the variations in the original scene irradiance.

Denote the original unblended source images as $$u_{i,j}^l = r_{i,j} + v_{i,j}^l, \quad (15)$$

where $r_{i,j}$ is the scene irradiance and $v_{i,j}^l$ are the per-image smooth intensity variations. A measure of smoothness needs to be defined, which can come from Eq. (14) evaluated at all the pixels except the boundary pixels. In other words, the deviation from zero gradient and the offsets at all pixels interior to the source regions is measured.

As an initial condition, set $h_{i,j}^l = v_{i,j}^l$. Under this condition, the terms in the full energy (Eq. (14)) corresponding to boundary pixels are exactly 0, since the offset functions $h_{i,j}^l$ exactly compensate for the smooth intensity variations $v_{i,j}^l$ added to the original scene irradiance $r_{i,j}$. Therefore, the particular solution $h_{i,j}^l = v_{i,j}^l$ has the exact same smoothness energy as the intensity variations $v_{i,j}^l$.

Relaxing the system further by minimizing Eq. (14) over all possible $h_{i,j}^l$ values will result in an even smoother solution (but may not match the actual smooth intensity variation $v_{i,j}^l$). Therefore, the original lemma that "the per-source offset maps are themselves smoothly varying" holds.

1.4 Spline Offset Maps

To take advantage of the smoothness of each offset image, each map is represented with a tensor-product spline that covers the visible extent of each region, and which has many fewer control points than the original number of pixels. The choice of pixel spacing (subsampling) S is problem dependent in that it depends on the amount of unmodeled variations in the scene and the acquisition process. However, it is largely independent of the actual pixel (sensor) resolution.

Once S and the control grid locations have been chosen, each individual offset map can be rewritten as the linear combination of some tensor-product spline bases, $$h_{i,j}^l = \sum_{km} B(i - kS, j - mS) c_{k,m}^l, \quad (16)$$

where $$B(i, j) = b(i)b(j), \quad (17)$$

is a 2D tensor product spline basis and the $c_{k,m}^l$ are the spline control points corresponding to each offset map $h^l$.

Any appropriate spline base can be employed (e.g., linear, quadratic B-spline, and so on). In tested embodiments, the following linear spline was used, $$b_1(i) = \begin{cases} i/S & 0 \le i < S \\ S - i/S & S \le i < 2S \\ 0 & \text{elsewhere} \end{cases} \quad (18)$$

$$b_1(j) = \begin{cases} j/S & 0 \le j < S \\ S - j/S & S \le j < 2S \\ 0 & \text{elsewhere} \end{cases} \quad (19)$$

The values of $h_{i,j}^l$ in Eq. (16) can now be substituted into Eq. (14) to obtain a new energy function that only depends on the spline control variables $c_{k,m}^l$:

$$E_4 = \sum_{i,j} s_{i,j}^x \left[ \sum_{k,m} B(i+1-kS, j-mS) c_{k,m}^{l_{i+1,j}} - B(i-kS, j-mS) c_{k,m}^{l_{i,j}} - g_{i,j}^{-x} \right]^2 +$$

$$s_{i,j}^x \left[ \sum_{k,m} B(i-kS, j+1-mS) c_{k,m}^{l_{i,j+1}} - B(i-kS, j-mS) c_{k,m}^{l_{i,j}} - g_{i,j}^{-y} \right]^2 +$$

$$w_{i,j} \left[ \sum_{k,m} B(i-kS, j-mS) c_{k,m}^{l_{i,j}} \right]^2 \quad (22)$$

This new energy function can be minimized as a sparse least squares system to compute a smooth spline-based approximation to the offset fields. Once the sparse least squares system has been solved (as will be described later), the actual per-pixel offset values can be computed using regular spline interpolation via Eq. (16). The offset values act as corrections to the pixel intensities of the image regions being blended. As such, they are applied to their associated pixels in the image regions to produce the blended image. In the foregoing case, the correction terms are applied by adding them to the intensity of their associated pixels.

Figure 5:
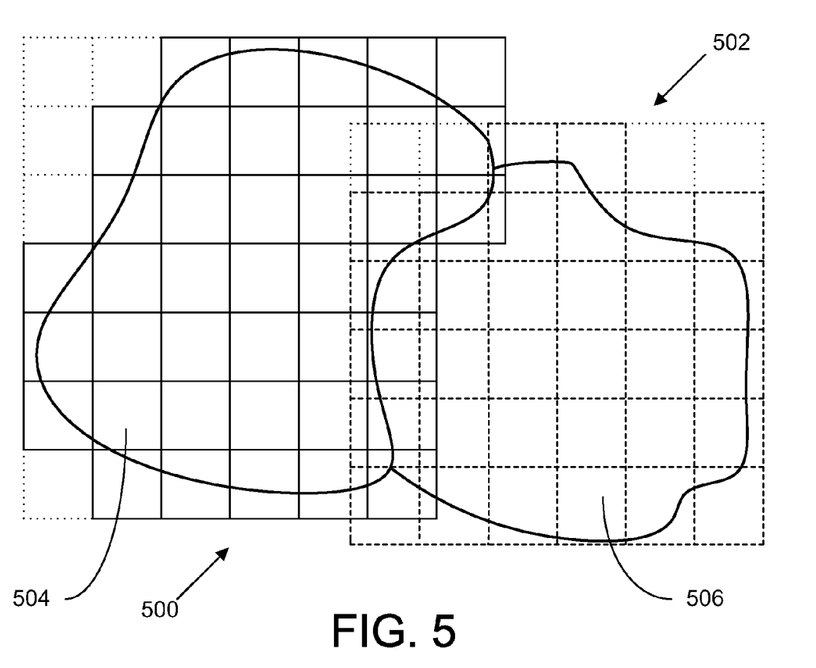
FIG. 5 is a diagram showing separate spline grids being superimposed onto each of two image regions and aligned with the associated region's bounding box.
Figure 6:
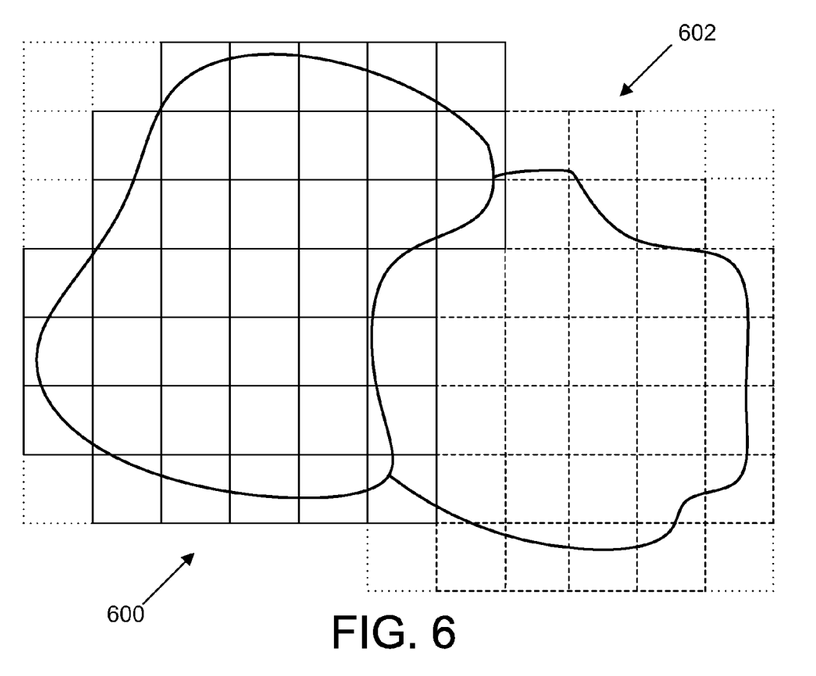
FIG. 6 is a diagram showing separate spline grids being superimposed onto each of two image regions and aligned with a final composite bounding box.

It is noted that the actual inner loop of the least squares system setup simply involves iterating over all the pixels, pulling out the $(K+1)^d$ non-zero B-spline basis function values (where K is the order of the interpolant and d is the dimensionality of the field), forming each of the linear equations in the control variables inside each squared term, and then updating the appropriate entries in the normal equations (stiffness matrix and right-hand side). In practice, it is not necessary to create spline control grids that cover the whole domain of the final composite solution. Instead, it suffices to compute a bounding box for each region (offset field) and allocate sufficient control points to describe the pixels inside each region. This is shown in FIG. 5 where separate spline grids 500 (solid lines), 502 (dashed lines) are superimposed onto each source region (two of which are shown 504, 506) and aligned with that region's bounding box. It is noted, however, that some solution methods for solving the aforementioned energy function work better if the individual spline grids are aligned with each other. This option is shown in FIG. 6, where the grids 600 (solid lines), 602 (dashed lines) are aligned with a final composite bounding box. Note that spline vertices that do not influence any visible pixels in FIGS. 5 and 6 can be eliminated from the variable set and are shown as dotted lines.

1.5 Simplifying the Constraints

Inside spline patches where all the pixels come from the same source, and where the smoothness and data weights are homogeneous, (i.e., $s_{i,j}^x = s_{i,j}^y = s$ and $w_{i,j} = w$), it is possible to pre-compute the effect of all the individual per-pixel gradient and smoothness constraints ahead of time. This results in a significant reduction in the amount of computation required to set up the least squares system. In tested embodiments it is assumed, for the purposes of computing the internal smoothness constraints, that interpolating spline uses conforming triangular linear elements. This results in the following simple per-image region energy function that is a coarsened version of the original fine-level blending energy, $$E^l = \sum_{k,m} s[c^l_{k+1,m} - c^l_{k,m}]^2 + s[c^l_{k,m+1} - c^l_{k,m}]^2 + S^2 w[c^l_{k,m}]^2 \quad (23)$$

To further speed up the formulation of the least squares system, this same discrete energy is applied to all spline patches within each offset layer. The original gradient constraints from Eq. (22) are then added in only along seam boundary pixels.

1.6 Solving the System

A variety of techniques can be used to solve the small sparse positive definite system of equations arising from the multi-spline correction fields. For example, a LDU decomposition method could be employed. In addition, it was found that a nested dissection technique works well for two dimensional grid problems such as the multi-spline system of equations produced with embodiments of the multi-spline image blending technique described herein. This latter solving technique recursively splits the problem along small length rows or columns. Thus, better results are obtained if all the spline variables line up in the same rows and columns. This can be accomplished by aligning the spline grids overlaid on each source region (as described previously) to a composite bounding box encompassing all the source regions, prior to establishing the control grid locations $c_{k,m}^l$.

1.7 Multi-Spline Image Blending Process

Figure 7A:
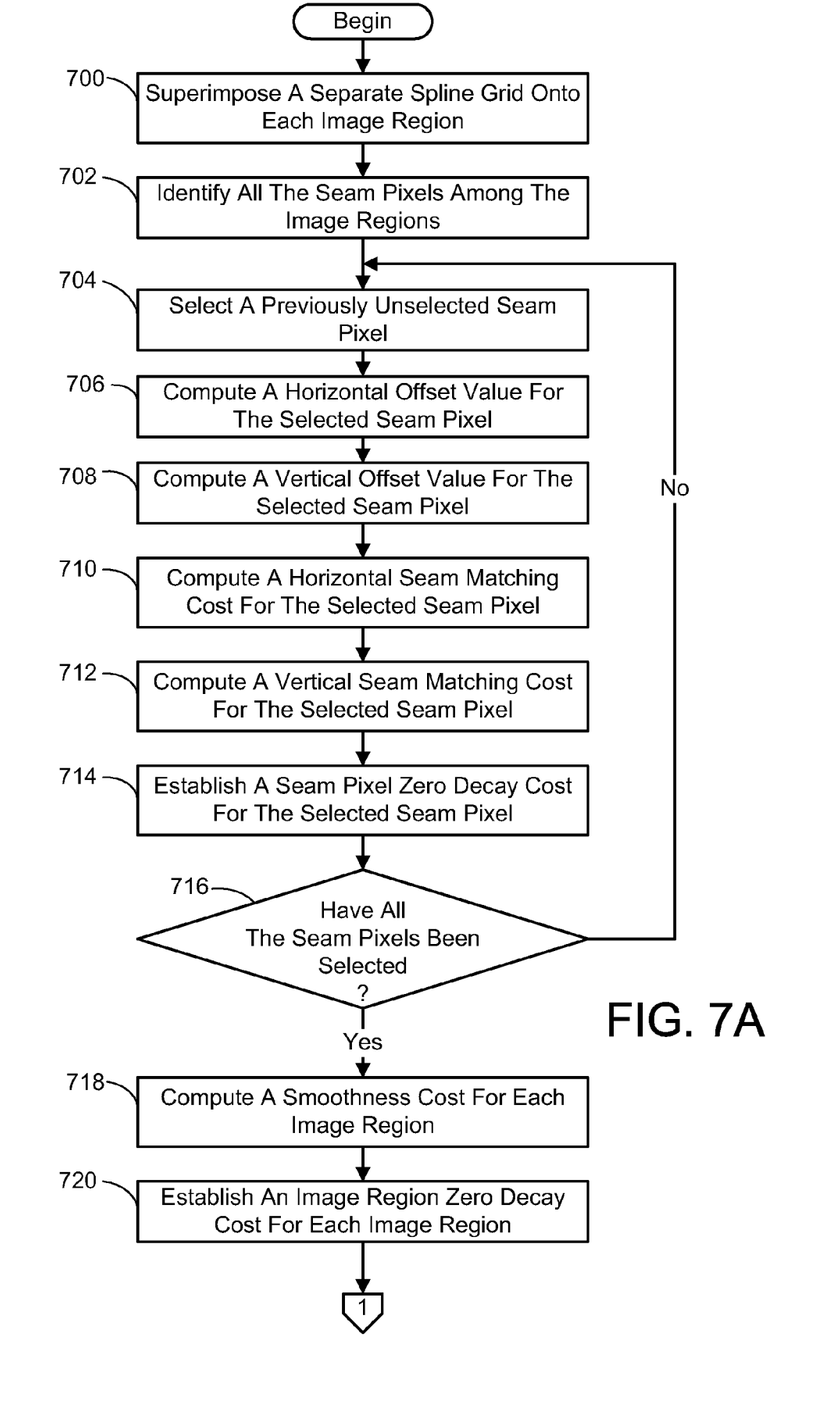
FIGS. 7A-B are a continuing flow diagram outlining one implementation of the general multi-spline image blending technique embodiment shown in FIG. 1.
Figure 7B:
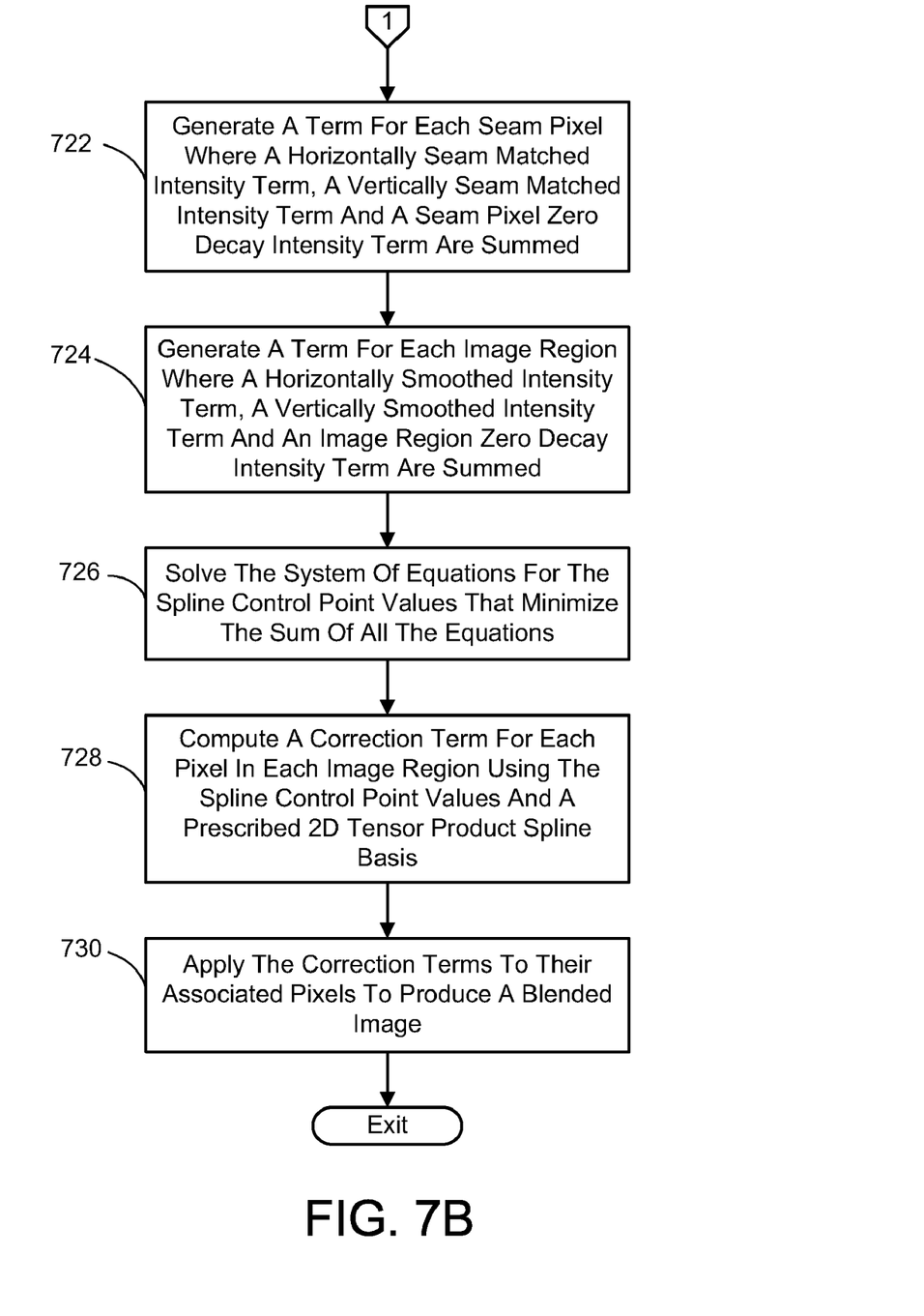

Referring to FIGS. 7A-B, one way of implementing the above-described multi-spline image blending technique embodiments is using the following process. The process first involves superimposing a separate spline grid onto each image region (700). As mentioned previously, each spline grid includes a number of spline control points having a prescribed spacing. All the seam pixels among the image regions are then identified (702), and a previously unselected seam pixel is selected (704). A horizontal offset value representing the average of the intensity gradients between two adjacent image regions one of which is in the positive horizontal direction from the selected seam pixel is computed (706) based on Eq. (11). In addition, a vertical offset value representing the average of the intensity gradients between two adjacent image regions one of which is in the positive vertical direction from the selected seam pixel (708) based on Eq. (12). A horizontal seam matching cost for the selected seam pixel is computed next (710) based on Eq. (6), along with a vertical seam matching cost (712) based on Eq. (7). It is noted that these seam matching costs decrease as the respective horizontal and vertical offset values increase. A seam pixel zero decay cost is also established for the selected seam pixel (714). It is then determined if all the seam pixels have been selected and processed (716). If not, actions 704 through 716 are repeated. If there are no remaining unselected seam pixels, then the process continues with the computation of a smoothness cost for each image region based on the variations in intensity between locations in the image region corresponding to a prescribed number of spline control points (718). In one embodiment, this involves computing the sum of the squares of the differences between the values associated with four mutually adjacent spline control points in the image region. An image region zero decay cost is then established for each image region (720).

A system of equations is generated next. This involves, for each seam pixel, generating an equation where a horizontally seam matched intensity term, a vertically seam matched intensity term and a seam pixel zero decay intensity term are summed (722) based on Eq. (22). The seam pixel terms are dependent on unknown spline control point values associated with the image regions forming the seam that the seam pixel belongs to. Generating the system of equations also involves, for each image region, generating an equation where a horizontally smoothed intensity term, a vertically smoothed intensity term and an image region zero decay intensity term are summed (724) based on Eq. (23). In this case, the image region terms are dependent on unknown spline control point values associated with the image region. The resulting system of equations is then solved for the spline control point values that minimize the sum of all the equations (726).

Next, a correction term is computed for each pixel in each image region based on the values exhibited at spline control points and a prescribed 2D tensor product spline basis (728) based on Eq. (16). The correction term associated with each pixel is then applied to that pixel to produce a blended image from the image regions (730).

2.0 Multiplicative (Gain) Offsets

In an alternate embodiment, multiplicative gain fields are computed instead of additive offset fields. In fact most visible seams in panoramas are due to camera exposure variation, vignetting, or illumination changes, all of which are better modeled as multiplicative gains rather than additive offsets. This is true even if the images are gamma-corrected, since the resulting images are still related by a multiplicative factor, i.e., $I_2 - kI_1 \Rightarrow I_2^\gamma = k^\gamma I_1^\gamma$.

To estimate a multiplicative gain, the logarithm of each input image is taken before computing the seam difference, or, equivalently, take the logarithm of the ratio of overlapping seam pixels. Dark pixels can be clamped to a minimum value such as 1. The resulting offset field is then exponentiated and used as a multiplicative gain field.

One way of implementing this alternate embodiment in the process of FIGS. 7A-B (not shown) would be to, prior to performing the action of associating a separate offset map with each image region, computing the logarithm of each pixel intensity value, and assigning the logarithm as the intensity value for its associated pixel location. Then, prior to performing the action of computing the correction terms, each spline control point intensity obtained from the solved equations would be exponentiated, and assigned as the spline control point intensity for its associated spline control point grid location. In this case, the action of applying the correction term would involve multiplying the correction term by the intensity of its associated pixel.

3.0 The Computing Environment

A brief, general description of a suitable computing environment in which portions of the multi-spline image blending technique embodiments described herein may be implemented will now be described. These embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 8:
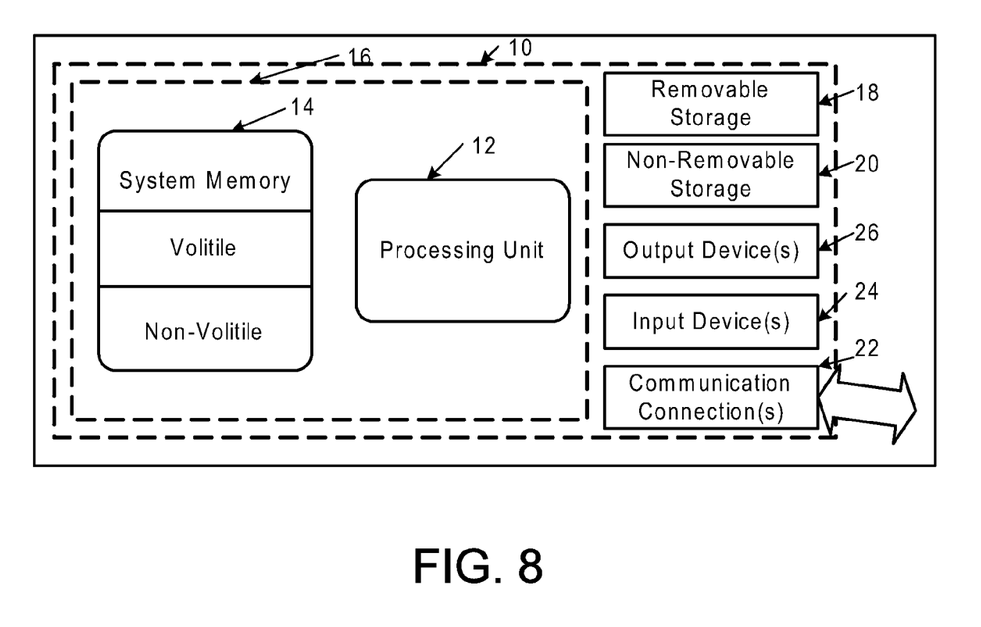
FIG. 8 is a diagram depicting a general purpose computing device constituting an exemplary system for implementing multi-spline image blending technique embodiments described herein.

FIG. 8 illustrates an example of a suitable computing system environment. The computing system environment is only one example of a suitable computing environment and is not intended to suggest any limitation as to the scope of use or functionality of multi-spline image blending technique embodiments described herein. Neither should the computing environment be interpreted as having any dependency or requirement relating to any one or combination of components illustrated in the exemplary operating environment. With reference to FIG. 8, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 8 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 8 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well know in the art and need not be discussed at length here.

The multi-spline image blending technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

4.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for blending image regions, comprising using a computer to perform the following process actions:
    associating a separate offset map with each image region being blended;
    representing each offset map using a separate low-dimensional spline;
    for each separate low-dimensional spline, establishing an energy function equation comprising the summation of a set of terms comprising a separate term defining the difference in blended values of spline control points for each seam pixel and a separate term for each image region defining the blended values of the spline control points for each region, to produce a system of equations, wherein a seam pixel is a pixel whose location corresponds to the boundary between two adjacent image regions;
    solving the system of equations for the spline control point values that minimize the sum of all the terms;
    computing a correction term for each pixel in each image region based on the spline control point values exhibited at spline control points and a prescribed 2D tensor product spline basis; and
    applying the correction term associated with each pixel to that pixel to produce a blended image from the image regions.

2. The process of claim 1, wherein the image regions are color image regions, and wherein the actions of establishing the energy function, solving the system of equations, computing the correction terms, and applying the correction terms are performed separately for each color channel to produce separate blended color-channel images, and wherein the process further comprises an action of combining the separate blended images for each color channel to produce said blended image.

3. The process of claim 1, wherein the process action of applying the correction term, comprises adding the correction term to the intensity of its associated pixel.

4. The process of claim 1, further comprising the process actions of:
    prior to performing the action of associating a separate offset map with each image region,
        computing the logarithm of each pixel intensity value, and
        assigning the logarithm as the intensity value for its associated pixel location; and
    prior to performing the action of computing the correction terms,
        exponentiating each spline control point value obtained from the solved equations, and
        assigning the exponentiated value as the spline control point value for its associated spline control point grid location, and wherein
    the process action of applying the correction term, comprises multiplying the correction term by the intensity of its associated pixel.

* * * * *